United States Patent
Pease et al.

(10) Patent No.: US 12,049,947 B2
(45) Date of Patent: Jul. 30, 2024

(54) SEGMENTED SPROCKET SYSTEMS AND METHODS FOR INSTALLING THE SAME

(71) Applicant: GATES CORPORATION, Denver, CO (US)

(72) Inventors: Jennifer E. Pease, Lakewood, CO (US); Christopher Wilkins, Castle Rock, CO (US)

(73) Assignee: Gates Corporation, Denver, CO (US)

( * ) Notice: Subject to any disclaimer, the term of this patent is extended or adjusted under 35 U.S.C. 154(b) by 0 days.

(21) Appl. No.: 17/871,177

(22) Filed: Jul. 22, 2022

(65) Prior Publication Data
US 2023/0035809 A1    Feb. 2, 2023

Related U.S. Application Data

(60) Provisional application No. 63/225,061, filed on Jul. 23, 2021.

(51) Int. Cl.
*F16H 55/12*    (2006.01)
*F16H 55/17*    (2006.01)

(52) U.S. Cl.
CPC .......... *F16H 55/12* (2013.01); *F16H 55/171* (2013.01)

(58) Field of Classification Search
CPC .... F16H 55/12; F16H 55/171; F16H 57/0018; F16H 55/06; F16H 55/17; F16H 2055/306; F16H 57/021; F16H 55/0813
See application file for complete search history.

(56) References Cited

U.S. PATENT DOCUMENTS

| | | | |
|---|---|---|---|
| 2,709,375 A | | 5/1955 | Sandberg |
| 2,748,618 A | * | 6/1956 | Lee .......................... F16H 55/12 74/439 |
| 2,859,635 A | | 11/1958 | Lee |
| 3,350,950 A | * | 11/1967 | Gandrud ................ B62D 55/12 474/902 |

(Continued)

FOREIGN PATENT DOCUMENTS

CN    112065951 A  *  12/2020  .............. B23P 15/14

OTHER PUBLICATIONS

Mail Stop PCT:ISA/US; Commissioner for Patents; Notification of Transmittal of the International Search Report and the Written Opinion of the International Searching Authority, or the Declaration; International PCT application No. PCT/US2022/037997; Date of Mailing: Dec. 19, 2022.

*Primary Examiner* — Zakaria Elahmadi
(74) *Attorney, Agent, or Firm* — Kevin J. Aiken, Esq.

(57) ABSTRACT

Segmented sprocket systems and methods for installing the segmented sprocket systems for use in numerous different applications such as, but not limited to, industrial sprockets. The present invention may be a segmented sprocket system including two or more relatively thin sprockets (100) that are installed together on a common hub (200) such that the two or more sprockets form a composite sprocket having a width approximately equal to the sum of the width of the individual sprockets. A segmented sprocket system may include a hub; at least two sprockets having the same outer diameter and an interior opening having a diameter approximately equal to the outer diameter of the hub; wherein the at least two sprockets are positioned on the hub such that each sprocket abuts a neighboring sprocket, thus resulting in a composite sprocket structure.

3 Claims, 6 Drawing Sheets

(56) References Cited

U.S. PATENT DOCUMENTS

| | | | |
|---|---|---|---|
| 4,127,038 A | 11/1978 | Browning | |
| 6,074,316 A * | 6/2000 | Murrietta, Sr. | F16H 55/30 |
| | | | 474/96 |
| 9,618,108 B2 * | 4/2017 | Palfai | F02B 75/28 |
| 2012/0308386 A1 | 12/2012 | Piech et al. | |
| 2013/0112027 A1 | 5/2013 | Buchleitner | |
| 2013/0213168 A1 | 8/2013 | Buchleitner et al. | |
| 2016/0033030 A1 * | 2/2016 | Palfai | F16H 55/18 |
| | | | 74/409 |
| 2022/0090668 A1 * | 3/2022 | Rieple | B29D 15/00 |
| 2022/0252143 A1 * | 8/2022 | Roozeboom | F16H 55/30 |

* cited by examiner

SEGMENTED SPROCKET SYSTEMS AND METHODS FOR INSTALLING THE SAME

TECHNICAL FIELD

The present application relates to segmented sprocket systems and methods for installing the segmented sprocket systems. More specifically, the present application relates to a segmented sprocket system including two or more relatively thin sprockets that are installed together on a common hub such that the two or more sprockets form a composite sprocket having a width approximately equal to the sum of the width of the individual sprockets.

BACKGROUND

Large diameter sprockets are used in numerous different applications. Such large diameter sprockets are typically of a unitary construction, and as such are extremely heavy due to their size and material construction. As a result, large diameter sprockets are often difficult to install. For example, in many instances, an industrial crane is required to install large diameter sprockets. This greatly reduces the ease of use and installation of such large diameter sprockets. Additionally, large diameter sprockets may be costly to manufacture.

Some previous efforts aimed at addressing issues presented by large diameter sprockets have included segmenting the large diameter sprocket into multiple pieces so that individual components of the overall sprocket are lighter and therefore easier to handle. Typically, this segmentation is radial segmentation, meaning multiple wedge segments are assembled together to form the complete 360-degree sprocket. However, assembly and installation of such radially segmented sprockets may still be complicated, requiring multiple fasteners to keep the individual pieces together, and it has generally been found that such radially segmented sprockets may decrease the life of belts used with these sprockets.

Accordingly, a need exists for a segmented sprocket system that addresses some or all of the issues faced by unitary large diameter sprockets and existing segmented sprockets. It would be desirable to provide a segmented sprocket system that is easy to install, relatively cheap to manufacture, and which performs comparably with or better than existing sprockets options.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In one embodiment of the technology described herein, a segmented sprocket system generally includes a hub having an outer diameter; and at least two sprockets, each of the at least two sprockets having the same outer diameter and an interior opening having a diameter approximately equal to the outer diameter of the hub. The at least two sprockets are installed on the hub by passing the hub through the interior opening of each sprocket. Additionally, the at least two sprockets are positioned on the hub such that each sprocket abuts a neighboring sprocket. This configuration results in a composite sprocket structure having a width approximately equal to the sum of the individual widths of each of the at least two sprockets.

In another embodiment of the technology described herein, a segmented sprocket system generally includes at least two sprockets, each sprocket having an identical inner diameter and outer diameter, and a hub, the hub having an outer diameter approximately equal to the inner diameter of the at least two sprockets. Each of the sprockets further include one or more protrusions extending radially inwardly from the interior diameter of the sprockets, and the hub incudes one or more generally axially aligned recesses formed in the outer surface of the hub. The one or more protrusions of each of the at least two sprockets are configured to engage with one or more recesses of the hub. When engaged, the protrusion and recesses system results in the sprockets being secured to the hub.

In other embodiments a single segmented sprocket could be used to provide the desired width and a secondary piece is mounted on the opposite side of the hub from where the single segment sprocket is mounted. This second piece serves to keep the single segmented sprocket piece mounted on the hub. Thus, when a single segmented sprocket piece is used, the segmented sprocket system include the single segmented sprocket piece, the hub, and the secondary piece used for locking the single segmented sprocket piece on the hub.

In still another embodiment of the technology described herein, a method of installing a segmented sprocket system generally includes the steps of: sliding a first sprocket onto a hub by passing the hub through an interior opening of the first sprocket; a step of sliding a second sprocket onto a hub by passing the hub through an interior opening of the second sprocket; and a step of positioning the first and second sprocket on the hub such that the second sprocket abuts the first sprocket. The abutting first and second sprocket may be secured to each other and/or to the hub in order to form a composite sprocket having a width of a more traditional unitary sprocket, and may perform and function comparably to a traditional unitary sprocket.

These and other aspects of the technology described herein will be apparent after consideration of the Detailed Description and Figures herein. It is to be understood, however, that the scope of the claimed subject matter shall be determined by the claims as issued and not by whether given subject matter addresses any or all issues noted in the Background or includes any features or aspects recited in the Summary.

BRIEF DESCRIPTION OF THE DRAWINGS

Non-limiting and non-exhaustive embodiments of the disclosed technology, including the preferred embodiment, are described with reference to the following figures, wherein like reference numerals refer to like parts throughout the various views unless otherwise specified.

DETAILED DESCRIPTION

Embodiments are described more fully below with reference to the accompanying Figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

The segmented sprocket system described herein may generally include a hub and two or more complete sprockets installed axially on the hub. In some embodiments, each of the two or more complete sprockets are identical (e.g., with respect to overall configuration, outside diameter, number of teeth, number of spokes, etc.), with the exception of the axial width of each sprocket, which may or may not be the same. In other embodiments, the two or more complete sprockets can differ in any respect, save for the outside diameter and the number, size, shape and configuration of the teeth. For example, in such embodiments, each sprocket may have a different number of spokes but still have identical outside diameter and teeth configuration. In still other embodiments, the two or more complete sprockets can differ in any respect, save for the number, size, shape and configuration of the teeth. For example, in such embodiments, each sprocket may have a different number of spokes and a different outside diameter, but still have identical teeth configuration.

When installed axially on the hub, the complete sprockets abut one another such that they form a composite sprocket that has a width equal to the sum of the width of the individual sockets. In this manner, the composite segmented socket may be similar to a non-segmented sprocket in form and function, but the segmented socket is significantly easier to install due to each individual sprocket component weighing substantially less than a unitary large diameter sprocket. As such, installation of the segmented sprocket is significantly easier than a unitary sprocket, which due to its weight, often requires the use of an industrial crane for installation.

As described in greater detail below, locking mechanisms included on the sprockets and hub can be used to secure the sprockets to the hub, and bolts extending through aligned spokes of adjacent sprockets can be used to secure the individual sprockets to each other. These features help to form a more robust composite sprocket despite the fact that the composite sprocket is made from a combination of thinner individual sprocket segments.

Figure 1:
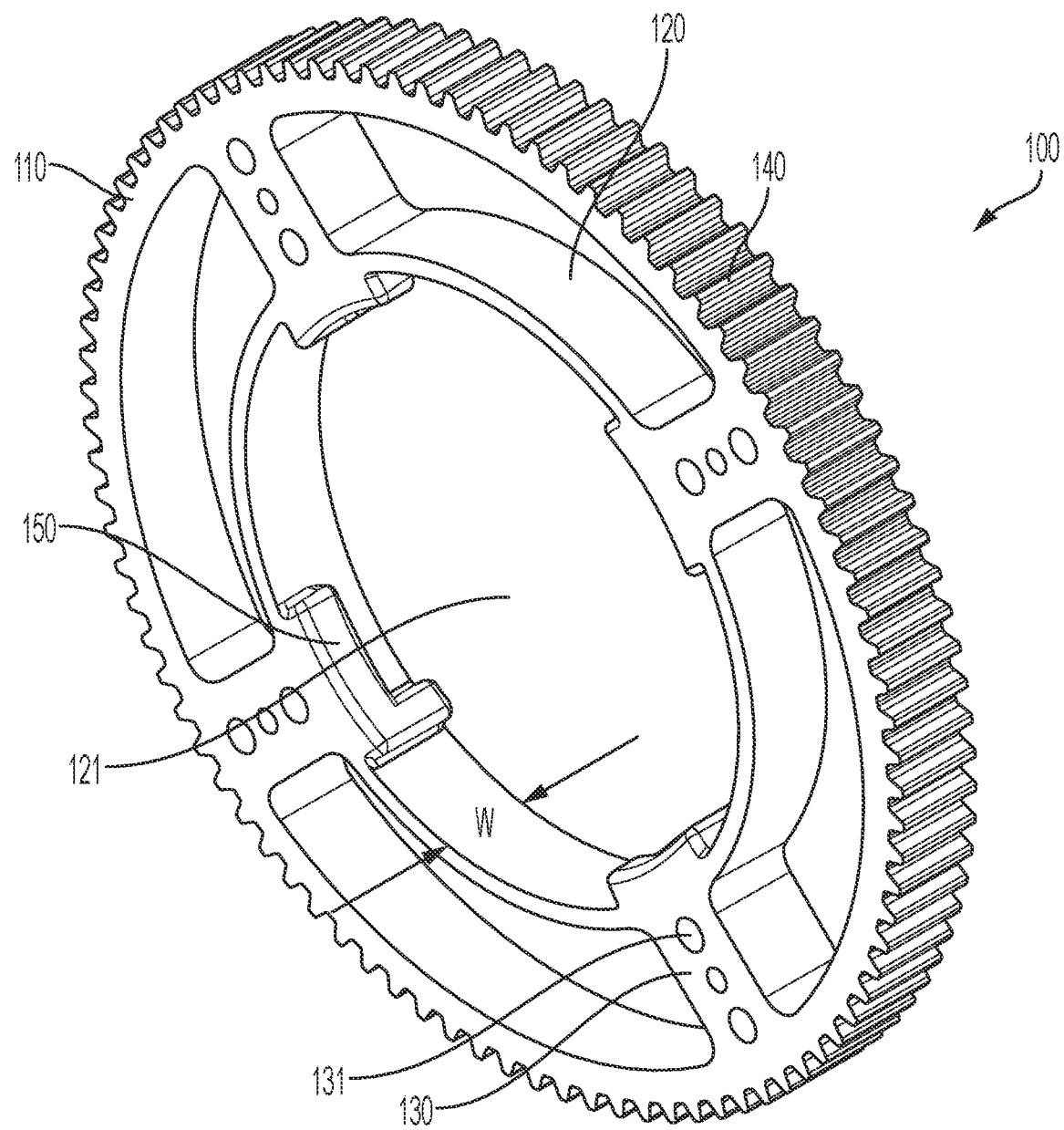
FIG. 1 is a perspective view of a sprocket in accordance with various embodiments described herein.

With respect to FIG. 1, a sprocket 100 suitable for use in a segmented sprocket system is shown. The sprocket 100 may generally comprise an outer ring 110 having an outer diameter and an inner ring 120 that defines an interior opening 121 having an inner diameter. The outer ring 110 may be connected to the inner ring 120 via a plurality of spokes 130. While FIG. 1 illustrates the sprocket 100 as having four spokes 130 spaced 90 degrees apart from each other, it should be appreciated that the specific number and spacing of the spokes 130 is not limited. For example, the sprocket can have five spokes, six spokes, or any other number of spokes.

On the outer circumference of the sprocket 100, the sprocket includes a plurality of teeth 140. The number of teeth, the specific shape and size of the teeth, and the spacing of the teeth are not limited, and may be selected based on the specific application of the sprocket 100.

Sprocket 100 further includes a width W. The width W of the sprocket is generally not limited, but in some embodiments, the width of the sprocket is less than traditional unitary large diameter sprockets such that the combination of multiple axially aligned sprockets 100 make up the width of a traditional unitary large diameter sprocket. In some embodiments, the sprockets 100 can have the same axial width. In other embodiments, a segmented sprocket system utilizes sprockets 100 having one of two widths (e.g., W1 and W2). Different combinations of sprockets having W1 or W2 can generally be used to provide a composite sprocket suitable for use with most standard pulley sizes. For example, in some embodiments, sprocket 100 has a either a width of 35.75 mm (A segment) or 52 mm (B segment). As shown in Table 1, the combination of these two widths can be combined in different combinations to provide a composite sprocket essentially equivalent in width to five of the most standard unitary sprocket widths.

TABLE 1

| Exemplary Combinations for Segmented Sprockets Widths | | | | | |
|---|---|---|---|---|---|
| Standard Unitary Sprocket Widths (mm) | 35 | 52 | 85 | 107 | 143 |
| Segmented Sprocket Pieces Required to Provide Standard Unitary Sprocket Widths | A | B | A + B | 3 * A | 4 * A |
| Total Width of Segmented Sprocket (mm) | 35.75 | 52 | 87.75 | 107.25 | 143 |

While the above example describes a segmented sprocket system including sprockets having one of two widths, it should be appreciated that the segmented sprocket system may include sprockets having more than two standard widths, such as three, four, five or more standard widths.

The above example further covers embodiments where a single segmented sprocket could be used to provide the desired width (e.g., only segment A is required when the desired sprocket width is 35 mm; only segment B is required when the desired sprocket width is 52 mm). In such embodiments, a secondary piece is mounted on the opposite side of the hub from where the single segment sprocket is mounted. This second piece serves to keep the single segmented sprocket piece mounted on the hub. Thus, even when a single segmented sprocket piece is used, the segmented sprocket system still requires multiple components (e.g., the single segmented sprocket piece, the hub, and the secondary piece used for locking the single segmented sprocket piece on the hub.

As also shown in FIG. 1, the spokes 130 of sprocket 100 may include one or more apertures 131 extending through the width of the spokes 130. When multiple sprockets 100 are axially aligned on a hub as described in greater detail below with respect to FIG. 3, the identical configuration of the multiple sprockets (save for sprocket width W, which can but need not be identical between sprockets) means that the spokes 130 of neighboring sprockets 100 can be aligned. When the spokes 130 of neighboring sprockets 100 are aligned, the apertures 131 are also aligned, meaning that a fastener (such as, but not limited to, a bolt, pin, or screw), can be extended through aligned apertures as a means for securing together the axially aligned sprockets 100. Multiple fastener types (e.g., bolts and pins) can also be used in some embodiments.

As will be described in greater detail below with respect to FIG. 3, sprocket 100 can also include one or more protrusions 150 extending radially inwardly from the inner ring 120. These protrusions 150 are used as part of a locking mechanisms that secures each sprocket 100 to the hub. FIG. 1 shows the sprocket 100 as including four protrusions 150, each located radially aligned with a spoke 130 and having a generally L shape. However, it should be appreciated that the number, location, shape, and size of protrusions 150 is generally not limited, provided that the protrusions are designed to interlock with corresponding locking mechanisms provided on the hub and described in greater detail below with respect to FIG. 2.

It should be appreciated that the sprockets 100 shown in FIG. 1 may include additional features not illustrated in FIG. 1, such as features used to improve the tracking and engagement of a belt engaged with the sprocket 100.

Figure 2:
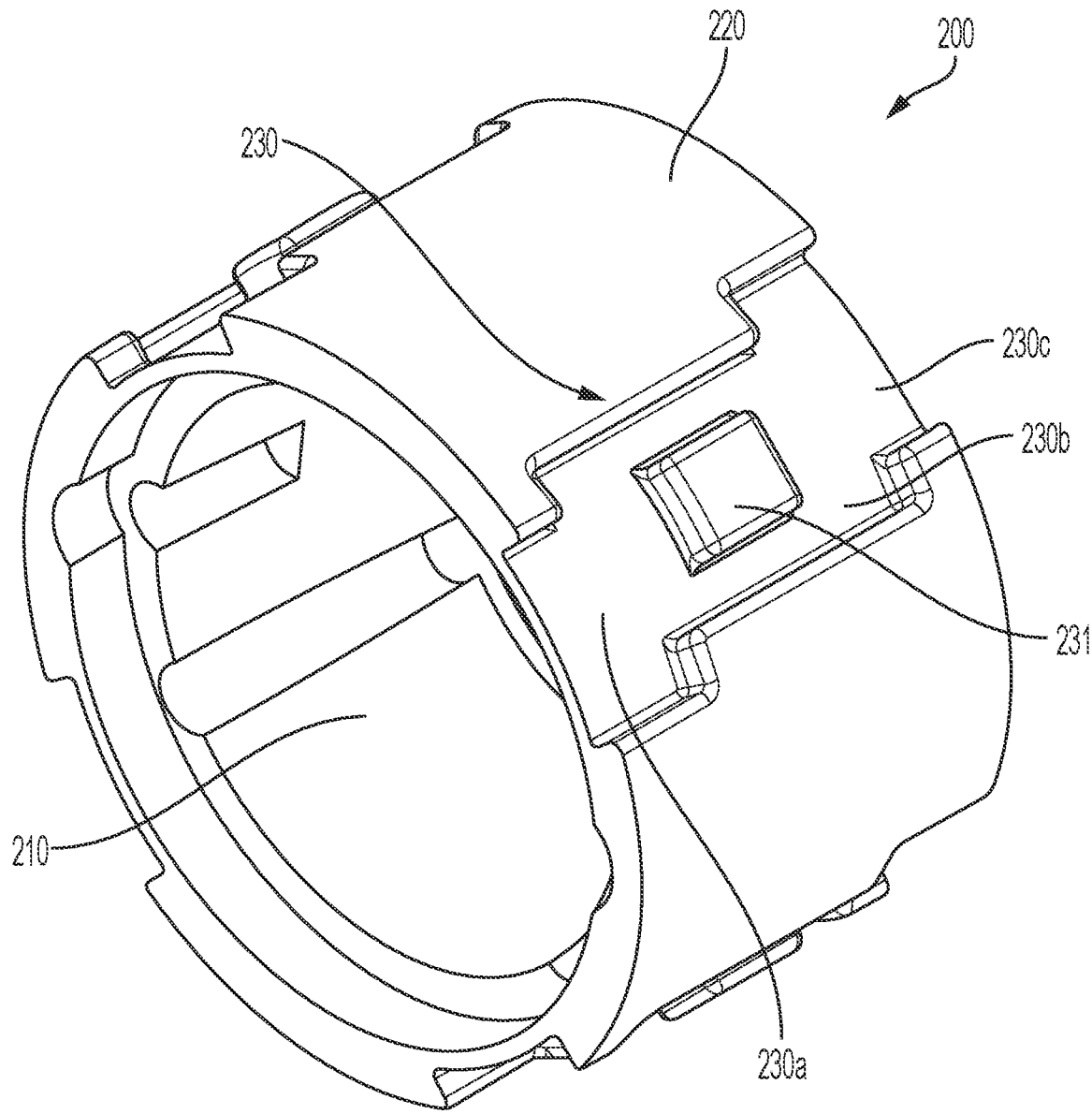
FIG. 2 is a perspective view of a hub in accordance with various embodiments described herein.

Referring now to FIG. 2, the segmented sprocket system may further include a hub 200. Hub 200 has a generally cylindrical shape, and includes an interior opening 210 extending through the width of the hub 200. The hub 200 further incudes an exterior surface 220 defining an outer diameter of the hub 200. In some embodiments, the outer diameter of hub 200 is approximately equal to the inner diameter of the sprocket 100 (established by the inner ring 120) such that when sprockets 100 slide on to hub 200, there is little to no gap between the inner ring 120 and the hub 200.

The width of the hub 200 is generally not limited, though in some embodiments, the width of the hub 200 is greater than or equal to at least the combined width of the two sprockets 100, such that at least two sprockets can be installed on the hub without extending past the width of hub 200. In some embodiments, the hub 200 is significantly wider than the width of a sprocket 100 such that multiple (e.g., 3, 4, 5 of more) sprockets 100 can be installed on hub 200.

While not shown in FIG. 2, the interior opening 210 of hub 200 may be sized and shaped such that a shaft attachment is disposed in the interior opening 210. Any suitable type of shaft attachment can be used. In some embodiments, the shaft attachment is a bushing that can be disposed in the interior opening 210. For example, the outside diameter of a bushing may be approximately the same as the diameter of the interior opening 210. A bushing provides a mechanism for securing or mounting the hub 200 (and sprockets 100 installed thereon) to a shaft that may be used to rotate the sprockets 100. The bushing can be a taper lock bushing, a QT bushing, or another suitable bushing for mounting the hub 200 to a shaft.

The exterior surface 220 of hub 200 has formed therein a plurality of recesses 230, the recesses 230 providing a locking mechanism when used in conjunction with the protrusions 150 of sprocket 100. Recesses 230 are generally aligned axially with the hub 200 and extend from one end of hub 200 to the opposite end of 200. This allows for sprockets 100 to be installed on hub 200 from either end of hub 200. As shown in FIG. 2, each recess 230 includes three segments 230*a*, 230*b*, 230*c*, with each segment being radially offset from the other segments. Each recess further includes a stop 231 located approximately halfway through or roughly in the center of the recess 230. While FIG. 2 shows the hub 200 having 4 recesses spaced 90 degrees apart, it should be appreciated that the hub 200 may have fewer or more recesses that may be spaced apart from each other in any manner. In some embodiments, the only limiting factor for the number, spacing and shape of the recesses 230 is that the recesses 230 correspond with the protrusions 150 on the sprockets 100 so the two can work together to form a locking mechanism between the hub 200 and the sprockets 100.

Based on the configuration of the protrusions 150 and recesses 230 shown in FIGS. 1 and 2, the manner in which a locking mechanism between the hub 200 and the sprockets 100 is as follows. A sprocket 100 is rotated until the protrusions 150 align with the opening of the recess 230 at either end of the hub 200. The sprocket 100 is then moved axially onto the hub 200 until the hub 200 beings to pass through the interior opening 121 of the sprocket 100. As the sprocket 100 is moved axially on to the hub 200, each protrusion 150 enters the first segment 230*a* of recess 230. Once the protrusion 150 hits the end of the first segment 230*a*, the sprocket 100 is rotated a few degrees so that the protrusion 150 is now axially aligned with the second segment 230*b* of the recess 230. At this point, further axial movement of the sprocket 100 on to the hub 200 is permitted, until the protrusion 150 hits the stop 231. The stop 231 prevents the sprocket 100 from passing all the way through the recess 230 (i.e., from one end of hub 200 to the other end of hub 200). When a further sprocket 100 is installed on the hub 200 using the same technique, the axial movement of the sprocket 100 is stopped by the presence of the first sprocket 100, rather than due to the stop 231. Additional sprockets 100 may be added in this manner from either side of the hub 200 until no further sprockets 100 can be rotated into the second segment 230*b* of recess 230. In some embodiments, the width of the second segment 230*b* may be correlated with the width of the sprockets 100 such that the entire width of second segment 230*b* can be occupied with sprockets 100, which can further secure the sprockets 100 to the hub 200.

While FIGS. 1 and 2 and the above description provide one manner of interlocking the sprocket 100 and the hub 200, it should be appreciated that the technology described herein is not limited to this specific interlocking mechanism, and other interlocking mechanisms capable of securing the sprocket 100 to the hub 200 may also be used. For example, in one alternate embodiment, the hub 200 may include protrusions rather than recesses, and the sprocket 100 may include recesses instead of protrusions, such that protrusions extending radially outwardly from the exterior surface 220 of the hub 200 engage with recesses formed in the interior surface of the inner ring 120 to thereby secure the sprocket 100 to the hub 200. Additionally, other shapes and sizes of protrusions and recesses, regardless of their location on the hub or sprocket, can also be used.

Figure 3:
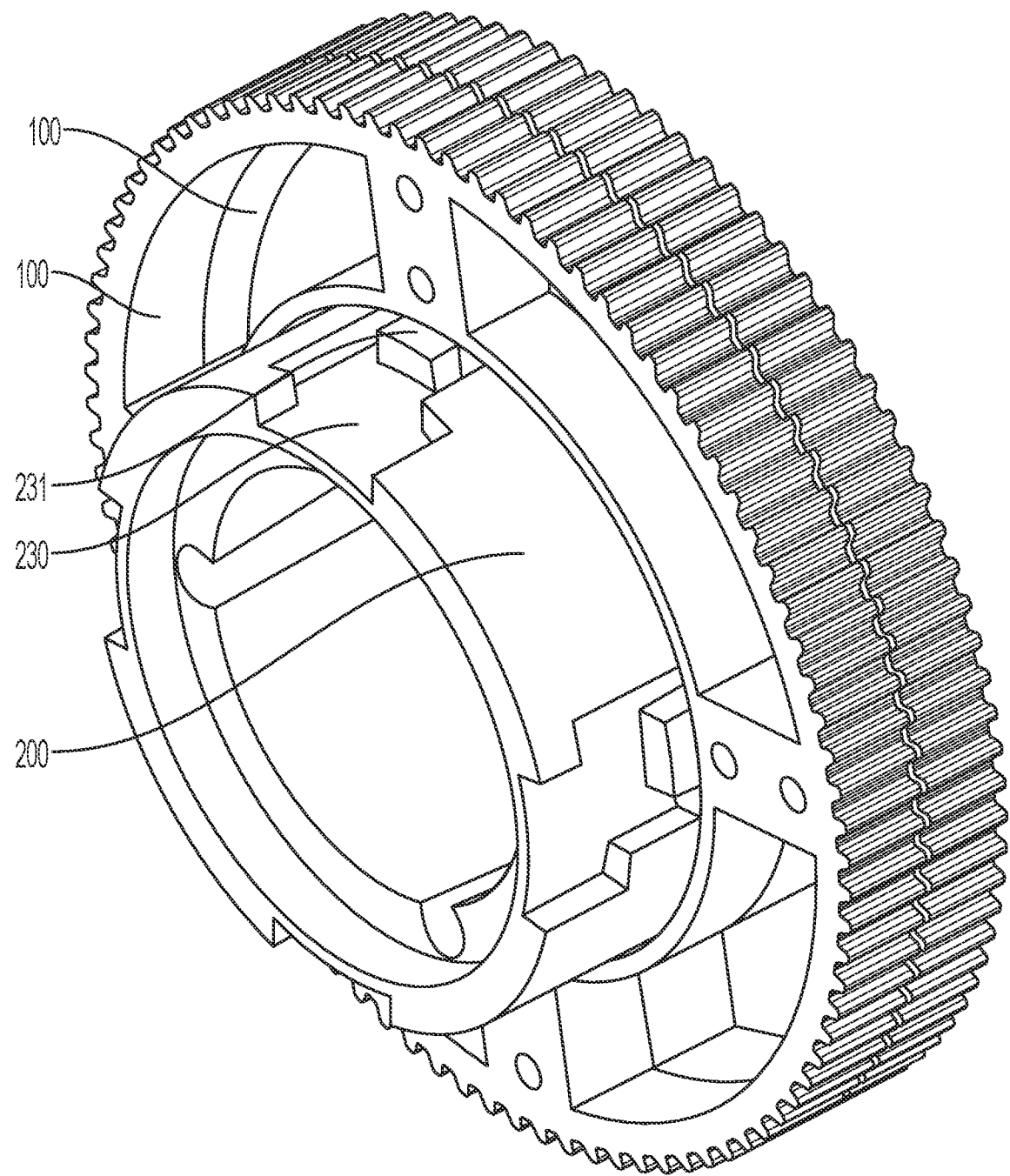
FIG. 3 is a perspective view of a segmented sprocket system in accordance with various embodiments described herein.

FIG. 3 illustrates two sprockets 100 installed on a hub 200 in the manner previously described such that the interlocking mechanism (i.e., the protrusions 150 and the recesses 230) secure the sprockets 100 to the hub 200. As shown in FIG. 3, the sprockets 100 have been installed on the hub 200 from the far end of the hub 200 (i.e., from the right side and moved to the left towards the center of the hub 200). The stop 231 prevents the sprocket 100 from moving further toward the close end of the hub 200. While not shown in FIG. 3, additional sprockets 100 may be installed on the hub 200 from the close end (i.e., from the left side and moved to the right towards the center of the hub 200).

Because each of the sprockets 100 has a width less than the total width of the final composite sprocket, the sprockets 100 weigh significantly less than a unitary sprocket. This makes handling and installation easier. In some embodiments, the weight of each sprocket is designed to be equal to or less than the weight of the bushing used to install the segmented sprocket system on a shaft. For example, if the bushing has a weight of 75 pounds, each sprocket 100 may be less than or equal to about 75 pounds. Similarly, if the bushing is 50 pounds, the sprockets 100 may be equal to or less than about 50 pounds. In some embodiments, the weight of the hub 200 may also be less than or equal to the weight of the bushing.

The segmented sprocket system described herein may provide several advantages, one of which is universal componentry that greatly simplifies the creation of various different sprockets from a relatively small subset of parts that have interchangeability. For example, in some embodiments, the hub component of the system described herein is a universal hub that works with any of a variety of different size and width sprockets to be installed thereon. In such embodiments, the hub may have a standard outer diameter and all sprockets to be used therewith, regardless of outer diameter, width, number of teeth, etc., may have an inner ring having the same diameter as the outer diameter of the hub. Similarly, the inner ring of all sprockets to be used with the hub, regardless of outer diameter, width, number of teeth, etc., may further include the same interlocking mechanisms configured to engage with the interlocking mechanisms included on all universal hubs. In such a configuration, a single universal hub can be used in the creation and installation of any size sprocket using the segmented sprocket components described herein due to the common interlocking mechanisms between the hub and sprocket componentry and in view of the aligned sizing between the external diameter of the hub and the internal diameter of the inner ring of the sprockets.

In such embodiments where a universal hub is employed, the diameter of the internal opening in the hub may also be fixed for universal applicability. In such embodiments, the specific bushing (or other shaft attachment) disposed within the internal opening can be used to ensure that the universal hub can be mounted on any size shaft. For example, the bushings, such as a taper lock or QT bushing, used with the system may all have a fixed outer diameter selected to be approximately the same as inner diameter of the internal opening of the hub, while the internal opening of the bushing may be varied in order to accommodate different size shafts.

Another benefit of the system described herein is that the system generally does not require the use of any type of fastener extending from the sprocket into the hub. In previously known systems, radially oriented fasteners may be required to help secure the sprocket to the hub. Such fasteners typically pass through a portion of the sprocket and into the hub to better secure the sprocket to the hub. Such fasteners are generally not required in the systems described herein at least in part because of the interlocking mechanism described herein. In some embodiments, the system described herein may be free of fasteners extending from the sprocket into the hub. The only fasteners that may be required in the system are the axially oriented fasteners used to secure adjacent sprockets to one another (i.e., fasteners extending through the spokes of adjacent sprockets as previously described herein).

Figure 4:
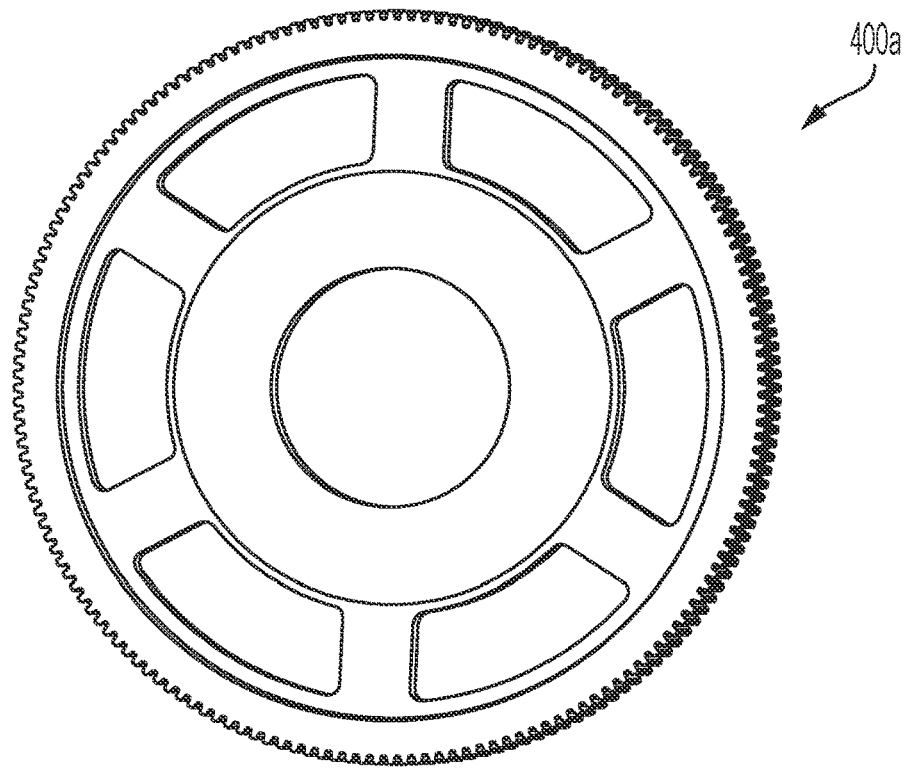
FIG. 4 are side plan views of various sprocket configurations in accordance with various embodiments described herein.
Figure 4:
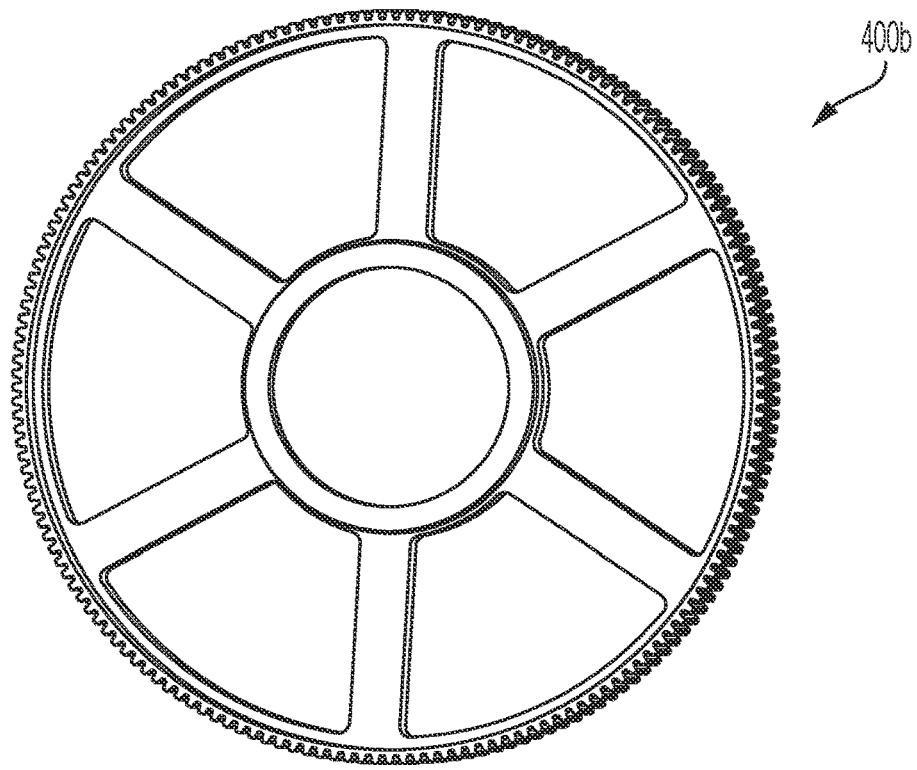

FIG. 4 illustrates various exemplary (though non-limiting) sprocket shapes and configurations that can be used in the systems and methods described herein. While FIG. 1, for example, illustrates a sprocket having four spokes, FIG. 4 illustrates how the sprockets 400a, 400b may have six spokes. As noted previously, any number of spokes can be used. The length and thickness of the spokes can also be varied as shown in FIG. 4. Sprockets 400a, 400b also illustrate how the thickness of the inner and outer rings can be any thickness, such as relatively thick inner and outer rings as shown in sprocket 400a, or relatively thin inner and outer rings as shown in sprocket 400b. While FIG. 4 provides just two alternate sprocket configurations, it should be appreciated that the specific configuration of the sprocket used in the systems and methods described herein is essentially unlimited. For example, the sprockets shown in FIGS. 1 and 4 all include spokes. However, in some embodiments, the sprockets may be solid disc-type sprockets that don't include spokes or an inner and outer ring. Instead, such sprockets are essentially solid material between the outer diameter and the inner diameter defining the interior opening. In such configurations, apertures may be provided in the solid material between the outer and inner diameter such that adjacent sprockets may still be secured together through the use of fasteners extending through aligned apertures in adjacent sprockets.

Figure 5:
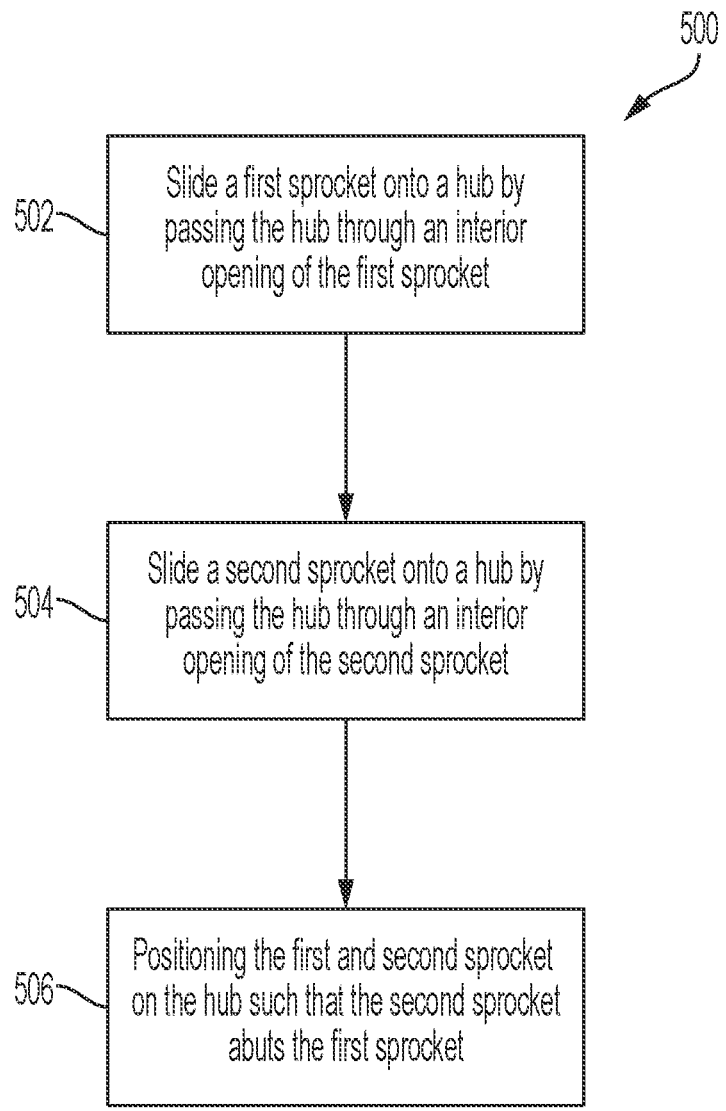
FIG. 5 is a flow chart illustrating a method for installing a segmented sprocket system in accordance with various embodiments described herein.
Figure 6:
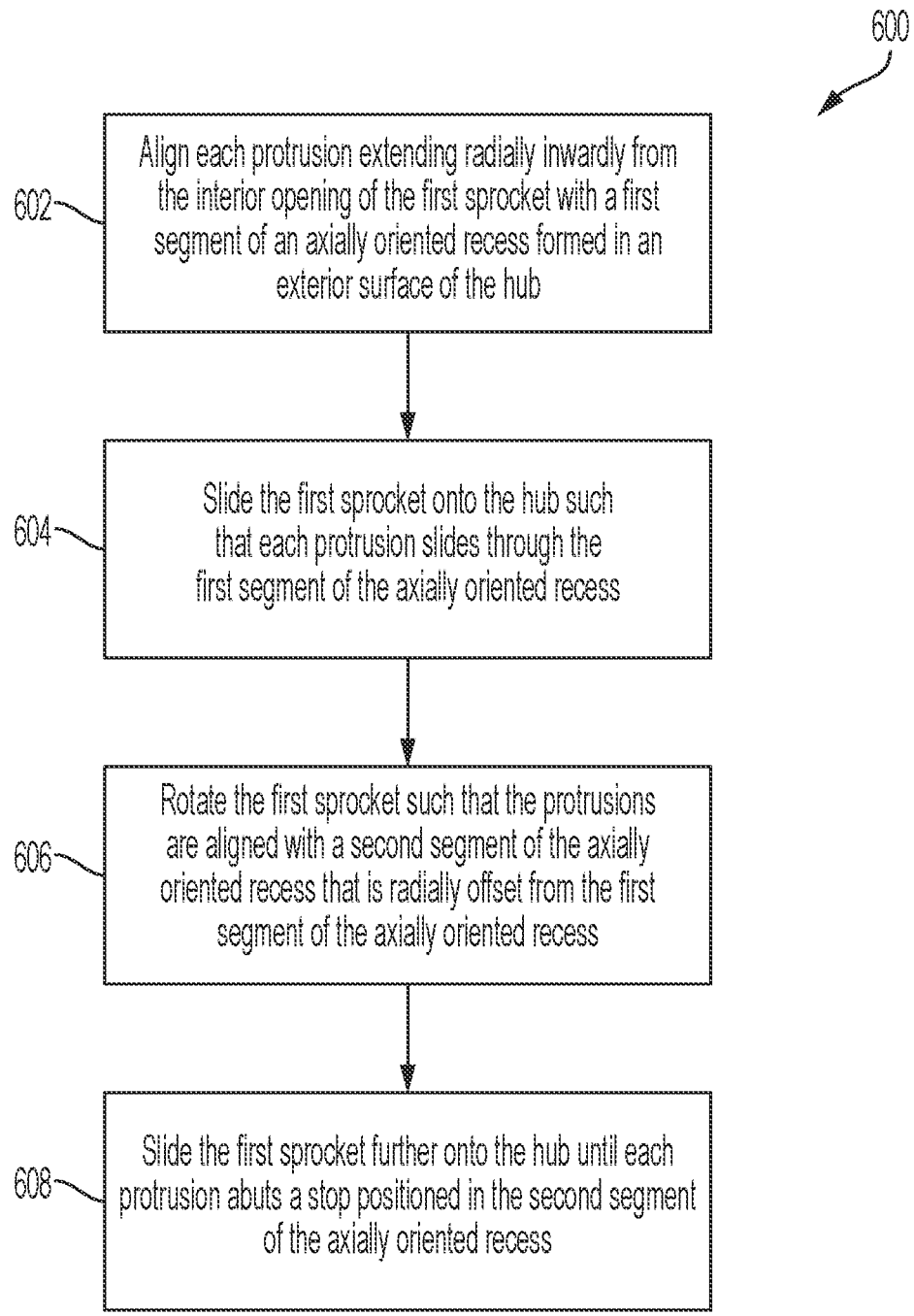
FIG. 6 is a flow chart illustrating a method for installing a segmented sprocket system in accordance with various embodiments described herein.

Embodiments of methods for installing the segmented sprocket system described herein are illustrated in FIGS. 5 and 6. Regarding FIG. 5, a method 500 for installing a segmented sprocket system generally includes a step 502 of sliding a first sprocket onto a hub by passing the hub through an interior opening of the first sprocket, a step 504 of sliding a second sprocket onto a hub by passing the hub through an interior opening of the second sprocket, and a step 506 of positioning the first and second sprocket on the hub such that the second sprocket abuts the first sprocket. As described previously, the first and second sprockets used in method 500 generally have a width and weight that is less than typical unitary large diameter sprockets. As a result, steps 502 and 504 can generally be carried out without need for a crane. Instead, a user may be able to lift, place and slide the sprocket in place on the hub manually due to the reduced weight of the individual components. That being said, any manner of sliding the sprockets on to the hub may be used, and steps 502, 504 can be carried out with the use of industrial equipment where desired.

Once the first and second sprocket are placed on the hub in steps 502, 504, the sprockets should be positioned such that neighboring sprockets abut one another on the hub. This helps to ensure that the sprockets are positioned in a composite sprocket configuration and most closely resemble and perform like a unitary sprocket. If a gap is located between neighboring sprockets, this may result in reduced performance or cause other issues with respect to the proper functioning of the sprocket.

As described in greater detail below, the manner of sliding the sprockets on to the hub and positioning the sprockets on the hub such that neighboring sprockets abut one another may entail manipulating the sprockets such that the interlocking mechanisms of the sprocket and hub engage and help to secure the sprockets to the hub.

With reference to FIG. 6, one embodiment a method 600 of using the interlocking mechanism to ensure the sprockets are secured to the hub includes a step 602 of aligning each of one or more protrusions extending radially inwardly from the interior opening of the first sprocket with a first segment of an axially oriented recess formed in an exterior surface of the hub, a step 604 of sliding the first sprocket onto the hub such that each of the one or more protrusions slides through the first segment of the axially oriented recess, a step 606 of rotating the first sprocket such that the one or more protrusions are aligned with a second segment of the axially oriented recess that is radially offset from the first segment of the axially oriented recess, and a step 608 of sliding the first sprocket further onto the hub until each of the one or more protrusions abuts a stop positioned in the second segment of the axially oriented recess. These steps can be repeated to a second sprocket, third sprocket, and so on as needed until no further sprockets can be secured on the hub.

Implementation of the method 600 may be better understood with reference to FIGS. 1 and 2 showing the sprocket protrusions and hub recesses. The sprocket 100 is rotated until the protrusions 150 align with the opening of the recess 230 at either end of the hub 200. The sprocket 100 is then moved axially onto the hub 200 until the hub 200 beings to pass through the interior opening 121 of the sprocket 100. As the sprocket 100 is moved axially on to the hub 200, each protrusion 150 enters the first segment 230a of recess 230. Once the protrusion 150 hits the end of the first segment 230a, the sprocket 100 is rotated a few degrees so that the protrusion 150 is now axially aligned with the second segment 230b of the recess 230. At this point, further axial movement of the sprocket 100 on to the hub 200 is permitted, until the protrusion 150 hits the stop 231. The stop 231 prevents the sprocket 100 from passing all the way through the recess 230 (i.e., from one end of hub 200 to the other end of hub 200). When a further sprocket 100 is installed on the hub 200 using the same technique, the axial movement of the sprocket 100 is stopped by the presence of the first sprocket 100, rather than due to the stop 231.

Additional sprockets 100 may be added in this manner from either side of the hub 200 until no further sprockets 100 can be rotated into the second segment 230b of recess 230. In some embodiments, the width of the second segment 230b may be correlated with the width of the sprockets 100 such that the entire width of second segment 230b can be occupied with sprockets 100, which can further secure the sprockets 100 to the hub 200.

While not illustrated in FIGS. 5 and 6, the methods described herein may further include steps for securing adjacent sprockets to one another. In some embodiments, such methods generally include aligning adjacent sprockets such that the spokes of the adjacent sprockets are aligned, including aligning holes included in each of the spokes. A fastener, such as a bolt or screw, can then be extended axially through the aligned holes in the aligned spokes such that the fastener secures together the adjacent sprockets. The fastener used to secure together adjacent sprockets is generally not limited. In some embodiments, the length of the fastener is selected such that it may extend through all sprockets used in the segmented sprocket system. For example, if the segmented sprocket system includes three sprockets installed on a hub, the length of the fastener may be sufficiently long such that the fastener extends through, and secures together, all three sprockets.

In some embodiments of the methods described herein, the method further includes installation steps regarding a bushing or other type of shaft attachment. As described previously, a bushing may be used as part of the system by disposing the bushing in the interior opening of the hub. The bushing provides a means for securing the hub and any sprockets installed thereon to a shaft. In some embodiments, the method begins with installing the bushing. That is to say, installation of the bushing may precede any installation of sprockets on the hub. In some embodiments, the initial step of the method involves disposing the bushing on the shaft, followed by placing the hub around the bushing. After the bushing and the hub are secured together (through conventional means), sprockets may be loaded on the hub. In other embodiments, the bushing is disposed in the interior opening of the hub, and then the combined hub and bushing are disposed on the shaft, and the combined bushing and hub are secured to the shaft (through convention means). Once the hub and bushing are secured to the shaft, the segmented sprockets may be installed on the hub.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A method of installing a segmented sprocket system, comprising:
sliding a first sprocket onto a hub by passing the hub through an interior opening of the first sprocket, wherein sliding the first sprocket onto the hub by passing the hub through the interior opening of the first sprocket comprises:
aligning each of one or more protrusions extending radially inwardly from the interior opening of the first sprocket with a first segment of an axially oriented recess formed in an exterior surface of the hub;
sliding the first sprocket onto the hub such that each of the one or more protrusions slides through the first segment of the axially oriented recess;
rotating the first sprocket such that the one or more protrusions are aligned with a second segment of the axially oriented recess that is radially offset from the first segment of the axially oriented recess; and
sliding the first sprocket further onto the hub until each of the one or more protrusions abuts a stop positioned in the second segment of the axially oriented recess;
sliding a second sprocket onto a hub by passing the hub through an interior opening of the second sprocket, wherein sliding the second sprocket onto the hub by passing the hub through the interior opening of the second sprocket comprises:
aligning each of one or more protrusions extending radially inwardly from the interior opening of the second sprocket with a first segment of an axially oriented recess formed in an exterior surface of the hub;
sliding the second sprocket onto the hub such that each of the one or more protrusions slides through the first segment of the axially oriented recess;
rotating the second sprocket such that the one or more protrusions are aligned with a second segment of the axially oriented recess that is radially offset from the first segment of the axially oriented recess; and
positioning the first and second sprocket on the hub such that the second sprocket abuts the first sprocket.

2. The method of claim 1, further comprising, prior to sliding the first sprocket onto the hub by passing the hub through the interior opening of the first sprocket:
disposing a shaft attachment in an interior opening of the hub.

3. The method of claim 2, further comprising, after disposing the shaft attachment in the interior opening of the hub but prior to sliding the first sprocket onto the hub by passing the hub through the interior opening of the first sprocket:

sliding a shaft through an interior opening of the shaft attachment disposed in the interior opening of the hub.

\* \* \* \* \*